(12) United States Patent
Someya

(10) Patent No.: US 11,048,450 B2
(45) Date of Patent: Jun. 29, 2021

(54) NON-TRANSITORY PROCESSOR READABLE MEDIUM STORING PRINTER PROGRAM, TERMINAL, AND METHOD OF CONTROLLING TERMINAL TO CONTROL A PRINTER ACCORDING TO A URL SCHEME

(71) Applicant: SEIKO EPSON CORPORATION, Tokyo (JP)

(72) Inventor: Tomohito Someya, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 62 days.

(21) Appl. No.: 16/231,386

(22) Filed: Dec. 21, 2018

(65) Prior Publication Data

US 2019/0196759 A1    Jun. 27, 2019

(30) Foreign Application Priority Data

Dec. 27, 2017   (JP) .............................. JP2017-251440

(51) Int. Cl.
*G06F 3/12* (2006.01)
*H04N 1/00* (2006.01)

(52) U.S. Cl.
CPC .......... *G06F 3/1227* (2013.01); *G06F 3/1204* (2013.01); *G06F 3/1205* (2013.01); *G06F 3/1224* (2013.01); *G06F 3/1246* (2013.01); *G06F 3/1247* (2013.01); *G06F 3/1284* (2013.01); *G06F 3/1294* (2013.01); *H04N 1/00676* (2013.01); *G06F 3/1297* (2013.01)

(58) Field of Classification Search
CPC ....... G06F 3/1244–1248; G06F 3/1227; G06F 3/1247; G06F 3/1246; G06F 3/1205; G06F 3/1284; G06F 3/1297; H04N 1/00676

See application file for complete search history.

(56) References Cited

U.S. PATENT DOCUMENTS

| | | | |
|---|---|---|---|
| 6,590,892 B1 * | 7/2003 | Lenander ................ | H04L 29/06 370/352 |
| 2002/0030842 A1 * | 3/2002 | Iida ..................... | H04N 1/00132 358/1.14 |
| 2004/0145769 A1 * | 7/2004 | Collier .................. | G06F 3/1205 358/1.15 |
| 2008/0028307 A1 * | 1/2008 | Oh ....................... | G06F 17/212 715/274 |

(Continued)

FOREIGN PATENT DOCUMENTS

| | | |
|---|---|---|
| JP | 2017-010089 A | 1/2017 |
| JP | 2017-021615 A | 1/2017 |
| JP | 2017-027182 A | 2/2017 |

*Primary Examiner* — Nicholas Pachol
(74) *Attorney, Agent, or Firm* — Chip Law Group

(57) ABSTRACT

A non-transitory processor readable medium storing a printer program read out and executed by a terminal processor of a tablet terminal connectable to a printer, in which the printer program causes the terminal processor to acquire received URL scheme information, which is structured according to a URL scheme and in which predetermined control of the printer is specified, from a browser application, convert the received URL scheme information into a control command executable by the printer, and transmit the converted control command to the printer.

21 Claims, 4 Drawing Sheets

(56) References Cited

U.S. PATENT DOCUMENTS

| | | | |
|---|---|---|---|
| 2014/0320903 A1* | 10/2014 | Kyoo | G06F 3/1292 |
| | | | 358/1.15 |
| 2015/0081268 A1* | 3/2015 | Ohhashi | G06F 11/36 |
| | | | 703/26 |
| 2015/0186085 A1* | 7/2015 | Ito | G06F 3/1247 |
| | | | 358/1.15 |
| 2017/0310845 A1* | 10/2017 | Miura | H04N 1/00832 |
| 2017/0322752 A1* | 11/2017 | Miura | G06F 3/1203 |
| 2017/0351467 A1* | 12/2017 | Wakabayashi | G06F 3/1204 |

* cited by examiner

NON-TRANSITORY PROCESSOR READABLE MEDIUM STORING PRINTER PROGRAM, TERMINAL, AND METHOD OF CONTROLLING TERMINAL TO CONTROL A PRINTER ACCORDING TO A URL SCHEME

This application claims priority under 35 U.S.C. § 119 to Japanese Patent Application No. 2017-251440 filed on Dec. 27, 2017, the entire disclosure of which is expressly incorporated by reference herein.

BACKGROUND

1. Technical Field

The present invention relates to a non-transitory processor readable medium storing a printer program, a terminal, and a method of controlling a terminal.

2. Related Art

In the related art, there is known an application program which acquires information structured according to a Uniform Resource Locator (URL) scheme and which causes a process to be executed based on the acquired information (refer to, for example, JP-A-2017-10089). JP-A-2017-10089 discloses a technique in which a printing application, which acquires a URL scheme transmitted from an in-use application (application is abbreviated below as app) so as to execute a process related to a printer, displays an image of a display screen of the in-use app when switching from the display screen of the in-use app to a display screen of the printing app and suppresses a feeling of discomfort accompanying the switching from the in-use app to the printing app from being imparted to the user.

However, JP-A-2017-10089 does not disclose carrying out various types of control at arbitrary timings with respect to the printer based on the information structured according to the URL scheme.

SUMMARY

An advantage of some aspects of the invention is to make it possible to carry out various types of control with respect to a printer at arbitrary timings according to a URL scheme.

An embodiment of the invention is a non-transitory processor readable medium storing a printer program read out and executed by a processor in a terminal connectable to a printer to execute steps including acquiring first information, which is structured according to a URL scheme and in which predetermined control of the printer is specified, from an upper level program (dominance program) of the printer program (lower level program, subordinate program), converting the first information into second information executable by the printer, and transmitting the converted second information to the printer.

According to this configuration, the printer program of the non-transitory processor readable medium causing the processor of the terminal to acquire the first information which is structured according to a URL scheme and in which predetermined control of the printer is specified makes it possible to cause the printer to execute the predetermined control, thus, it is possible to carry out various types of control of the printer at arbitrary timings according to the URL scheme.

In addition, the first information includes information in which control of a mechanism of the printer is specified, and the second information includes a command which is executable by the printer and which is for controlling the mechanism of the printer.

According to this configuration, the printer program of the non-transitory processor readable medium causing the processor of the terminal to acquire the first information which is structured according to a URL scheme and in which control of a mechanism of the printer is specified makes it possible to cause the printer to execute the control of the mechanism, thus, it is possible to control the mechanism of the printer at arbitrary timings according to the URL scheme.

In addition, the first information includes information in which control of an external device connected to the printer is specified, and the second information includes a command which specifies control of the external device by the printer.

According to this configuration, the printer program of the non-transitory processor readable medium causing the processor of the terminal to acquire the first information which is structured according to a URL scheme and in which control of an external device connected to the printer is specified makes it possible to execute the control of an external device in the printer, thus, it is possible to control an external device connected to the printer at arbitrary timings according to the URL scheme.

In addition, the first information includes information in which transmission of a status of the printer is specified, the second information includes a command for causing the status to be transmitted from the printer, and the steps further include acquiring third information structured according to the URL scheme in the upper level program when the status is received from the printer.

According to this configuration, the printer program of the non-transitory processor readable medium causing the processor of the terminal to acquire the first information which is structured according to a URL scheme and in which transmission of a status of the printer is specified makes it possible to cause the printer to execute the transmission of the status, thus, it is possible to acquire the status from the printer at arbitrary timings according to the URL scheme.

In addition, the first information includes information in which a setting is specified for causing the printer to transmit the status when the status of the printer changes, the second information includes a command in which a setting is specified for causing the printer to transmit the status when the status of the printer changes, and the steps further include acquiring the third information in the upper level program when the status is received from the printer even if the first information is not acquired from the upper level program.

According to this configuration, since the printer program of the non-transitory processor readable medium causes the processor of the terminal to acquire the third information in the upper level program when the status is received from the printer even if the first information is not acquired from the upper level program, it is possible to acquire the status of the printer promptly in a case where the status of the printer changes.

In addition, a terminal according to another embodiment of the invention is able to communicate with a printer and includes a memory which stores a printer program and an upper level program of the printer program, and a processor which reads out and executes the upper level program and the printer program from the memory, in which the processor reads out and executes the upper level program from the memory to generate first information which is structured according to a URL scheme and in which predetermined control of the printer is specified, and reads out and executes the printer program from the memory to convert the first information into second information which is executable by the printer and transmit the converted second information to the printer.

According to this configuration, the printer program causing the terminal to acquire first information which is structured according to a URL scheme and in which predetermined control of the printer is specified makes it possible to cause the printer to execute predetermined control, thus, it is possible to carry out various types of control of the printer at arbitrary timings according to the URL scheme.

In addition, still another embodiment of the invention is a method of controlling a terminal which is able to communicate with a printer, the method including executing a printer program, an upper level program of the printer program, and a printer program, generating the first information which is structured according to a URL scheme and in which predetermined control of the printer is specified through the upper level program, and converting the first information into second information which is executable by the printer and transmitting the converted second information to the printer through the printer program.

According to this configuration, in the method of controlling a terminal, acquiring first information which is structured according to a URL scheme and which specifies predetermined control of the printer in the printer program makes it possible to cause the printer to execute predetermined control, thus, it is possible to carry out various types of control of the printer at arbitrary timings according to the URL scheme.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
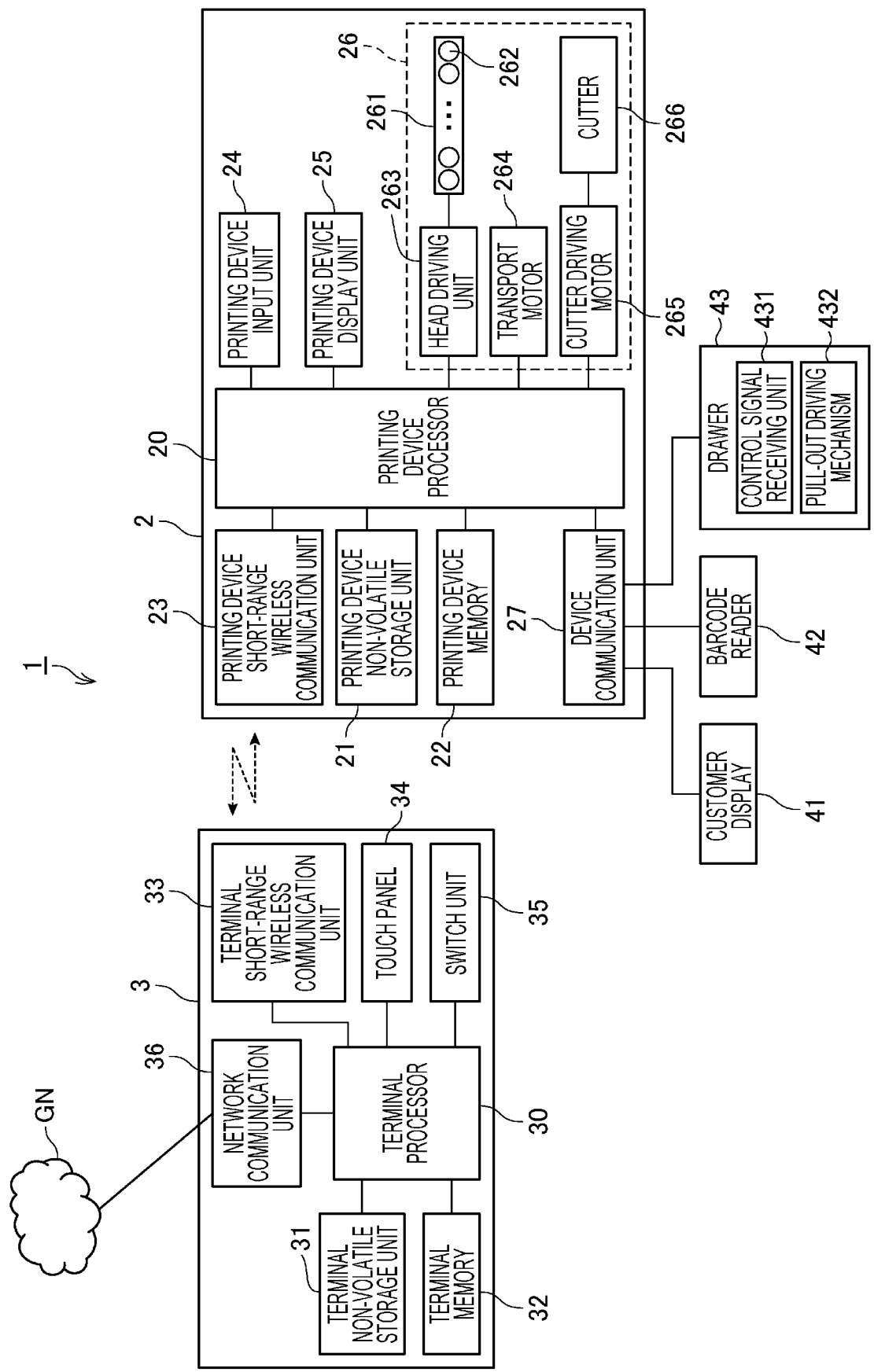
FIG. 1 is a diagram showing a configuration of a printing system.

FIG. 1 is a diagram showing a configuration of a printing system 1 according to one embodiment.

As shown in FIG. 1, the printing system 1 is provided with a printer 2 and a tablet terminal 3 (terminal). The printing system 1 is a POS system used in businesses such as retail businesses such as shopping centers, convenience stores, and sales on-board trains, and in the food and drink industry such as in restaurants, cafes, and pubs. The POS system is a system having a function of performing accounting for products purchased by a customer, a function of issuing receipts according to the accounting, and the like.

The printer 2 is a thermal printer which accommodates roll paper and forms dots on the accommodated roll paper with a line type thermal head 261 to print characters, images, or the like. The printing method of the printer 2 according to the present embodiment is a thermal method; however, the printing method of the printer 2 is not limited to the thermal method, and other printing methods such as an ink jet method may be used. In addition, the print head of the printer 2 is not limited to a line type, and may be a serial type.

The printer 2 is provided with a printing device processor 20, a printing device non-volatile storage unit (printing device non-volatile storage) 21, a printing device memory 22, a printing device short-range wireless communication unit (printing device short-range wireless communicator, communication port, communication circuit, communication connecter, communication board) 23, a printing device input unit (printing device input button, switch, tach panel, user interface) 24, a printing device display unit (printing device display) 25, a printing unit (printing mechanism) 26, and a device communication unit (device communicator, communication port, communication circuit, communication connecter, communication board) 27.

The printing device processor 20 is a processor which controls each unit of the printer 2. The printing device processor 20 is connected to the printing device non-volatile storage unit 21, the printing device memory 22, a printing device short-range wireless communication unit 23, the printing device input unit 24, the printing device display unit 25, the printing unit 26, and the device communication unit 27. The printing device processor 20 controls each unit of the printer 2 by transmitting and receiving data and signals to and from these units.

The printing device non-volatile storage unit 21 is a memory which is configured by a flash memory or an Electrically Erasable Programmable Read Only Memory (EEPROM) and which stores a program such as firmware which is read out and executed by the printing device processor 20 or various types of data which are read out by the printing device processor 20 to execute and process a program.

In a case where the printing device processor 20 executes a program, the printing device memory 22 forms a work area for temporarily storing a program to be executed and data to be processed.

The printing device short-range wireless communication unit 23 is provided with a substrate formed by a circuit which communicates with the tablet terminal 3 in accordance with a communication standard relating to predetermined short-range wireless communication, such as, for example, Bluetooth (registered trademark), under the control of the printing device processor 20.

The printing device input unit 24 is provided with an input means such as an operation switch or a touch panel provided in the printer 2, detects a user operation on the input means, and provides an output to the printing device processor 20. The printing device processor 20 executes a process corresponding to the operation on the input means based on the input from the printing device input unit 24.

The printing device display unit 25 is provided with a plurality of LEDs, a display panel, and the like and turns on, turns off, or flashes the LED in a predetermined manner, displays information on the display panel, or the like, under the control of the printing device processor 20.

The printing unit 26 executes printing based on a control command (second information) received from the tablet terminal 3 under the control of the printing device processor 20. The control command is a command for specifying the printing of characters, images, or the like on the roll paper, and includes character codes, commands for printing character codes, or the like. This control command is a command of the command system corresponding to the printer 2. The printing unit 26 is provided with a thermal head 261 (mechanism), a head driving unit 263, a transport motor 264 (mechanism), a cutter driving motor 265, and a cutter 266 (mechanism).

The thermal head 261 has a plurality of heat generating elements 262 formed of resistors arranged in a direction intersecting (for example orthogonal to) the transport direction of the roll paper. The thermal head 261 prints characters, images, and the like by energizing the heat generating elements 262 to generate heat and applying heat to the printing surface of the roll paper.

The head driving unit (head driver) 263 controls energization of the heat generating elements 262 of the thermal head 261 under the control of the printing device processor 20.

The transport motor 264 rotates the transport roller and transports the roll paper under the control of the printing device processor 20.

Under the control of the printing device processor 20, the cutter driving motor 265 drives a movable blade forming the cutter 266 so as to slide toward a fixed blade, and cuts the roll paper.

The device communication unit 27 is provided with ports conforming to USB standards, ports conforming to serial communication standards other than USB (RS 232C or the like), ports conforming to parallel communication standards (IEEE 1284 or the like), ports conforming to communication standards relating to wired LANs (Ethernet (Registered Trademark), or the like), and an interface board formed of circuits having other ports. It is possible to connect devices to each port. Under the control of the printing device processor 20, the device communication unit 27 communicates with a device connected to the printer 2 via a port.

A customer display (external device) 41, a barcode reader 42 (external device), and a drawer 43 (cash drawer, external device) are connected to the printer 2 as external devices to be connected thereto.

Under the control of the printing device processor 20, the customer display 41 displays information relating to accounting. It is possible for the customer who is performing the accounting at the cashier counter to visually confirm the information displayed on the customer display 41.

The barcode reader 42 reads the barcode attached to the product, the package of the product, or the like and outputs data indicating the reading result to the device communication unit 27. The device communication unit 27 outputs the data input from the barcode reader 42 to the printing device processor 20.

The drawer 43 is a device which is provided with a tray which accommodates cash or the like and a mechanism such as an electromagnet which is able to remove the hook of the tray and to allow withdrawal from the main body of the drawer 43. The device communication unit 27 is provided with a connector in accordance with, for example, the registered jack (RJ) standard, and is connected to the drawer 43 via a cable. This connector is provided with a total of six terminals which are exposed to the outside of the printer 2, for example, one power supply terminal which supplies electric power to the drawer 43, two control signal output terminals which output control signals for controlling the drawer 43, two terminals connected to a ground wire, and one signal input terminal for inputting tray open/close signals from the printer 2. The device communication unit 27 supplies electric power with a voltage value of 24 volts to the drawer 43 through the power supply terminal. In addition, the device communication unit 27 outputs a control signal to drive the electromagnet from either one of the two control signal output terminals to the drawer 43 to remove the hook and open the tray. In addition, a signal indicating the state of the drawer 43 is input to the device communication unit 27 from the drawer 43 via the signal input terminal.

As shown in FIG. 1, the drawer 43 is provided with a control signal receiving unit (control signal receiver, receiving port, receiving circuit, receiving connecter, receiving board) 431 and a withdrawal driving mechanism 432.

The control signal receiving unit 431 receives a control signal transmitted by the printing device processor 20 via the device communication unit 27. In the present embodiment, the control signal is a signal which shifts the state of the drawer 43 to a state where the tray of the drawer 43 is withdrawn from the main body of the drawer 43 (referred to below as an open state). In a case where the control signal receiving unit 431 receives the control signal, the control signal receiving unit 431 generates data which specifies the shift to the open state, and outputs the data to the withdrawal driving mechanism 432.

The withdrawal driving mechanism 432 is provided with a lock mechanism for locking a tray for accommodating cash or the like in the main body of the drawer 43 or releasing this lock, a withdrawal mechanism for moving the tray in a predetermined direction and withdrawing the tray, a control circuit for controlling the lock mechanism and the withdrawal mechanism, and the like. In a case where data which specifies a shift to the open state is input from the control signal receiving unit 431, the control circuit of the withdrawal driving mechanism 432 releases the lock using the lock mechanism. Next, the control circuit of the withdrawal driving mechanism 432 controls the withdrawal mechanism to move the tray in a predetermined direction and to set the state of the drawer 43 to an open state. When the tray is accommodated in the main body of the drawer 43 by the operation of the user, the withdrawal driving mechanism 432 operates the lock mechanism to lock the tray in the main body of the drawer 43.

Figure 2:
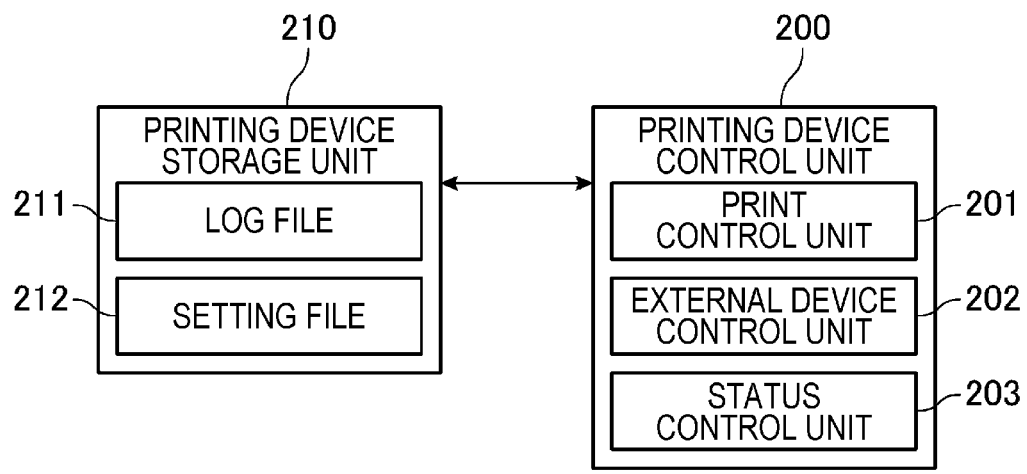
FIG. 2 is a functional block diagram of a printing device control unit and a printing device storage unit.

FIG. 2 is a functional block diagram of the printing device control unit (printing device controller, CPU, processor) 200 and the printing device storage unit (printing device storage) 210 forming the control system of the printer 2.

The printing device storage unit 210 shown in FIG. 2 is a logical storage unit formed of the printing device non-volatile storage unit 21 and/or the printing device memory 22. The printing device control unit 200 and each functional unit of the printing device control unit 200 are formed by cooperation between software and hardware due to the printing device processor 20 executing a program. The printing device control unit 200 and each functional unit of the printing device control unit 200 are, for example, formed of the printing device processor 20, the printing device non-volatile storage unit 21, and the printing device memory 22.

The printing device storage unit 210 stores a log file 211 and a setting file 212.

The log file 211 is a file in which information indicating events occurring in the printer 2 is recorded in time series.

The setting file 212 is a file which stores a combination of setting items related to settings of the printer 2 and setting values corresponding to the setting items.

The printing device control unit 200 has the functions of a printing control unit (printing controller, CPU, processer) 201, an external device control unit (external device controller, CPU, processor) 202, and a status control unit (status controller, CPU, processor) 203.

The printing control unit 201 controls the printing unit 26 to cause the printing unit 26 to execute printing based on a control command transmitted from the tablet terminal 3.

The external device control unit 202 controls the device communication unit 27 to cause the device communication unit 27 to execute control of the device based on the information transmitted from the tablet terminal 3. For example, in a case of causing the drawer 43 to shift to the open state, the external device control unit 202 causes the device communication unit 27 to transmit a control signal for shifting the state of the drawer 43 to the open state.

The status control unit 203 refers to the log file 211 stored in the printing device storage unit 210 to acquire the status of the printer 2. Examples of the statuses of the printer 2 acquired by the status control unit 203 include being out of roll paper, the presence or absence of head errors, the presence or absence of cutter errors, and the like. A head error refers to a state in which the cumulative number of uses of the thermal head 261 exceeds a predetermined threshold which is a reference for determining the lifespan of the thermal head 261. In addition, a cutter error refers to a state in which the cumulative number of uses of a cutter by the cutter 266 exceeds a predetermined threshold which is a reference for determining the lifespan of the cutter 266. In addition, the status control unit 203 transmits status information indicating the acquired status of the printer 2 to the tablet terminal 3 through the printing device short-range wireless communication unit 23.

Next, a description will be given of the tablet terminal 3.

The tablet terminal 3 is, for example, a tablet type (plate-shaped) terminal device provided with a touch panel 34 over a wide frontal region. At the time of accounting, the tablet terminal 3 functions as a host computer which controls the printer 2 by executing various processes related to the accounting.

The tablet terminal 3 is provided with a terminal processor 30 (processor), a terminal non-volatile storage unit (terminal non-volatile storage) 31, a terminal memory 32, a terminal short-range wireless communication unit (terminal short-range wireless communicator, communication port, communication circuit, communication connecter, communication board) 33, the touch panel 34, a switch unit (switch) 35, and a network communication unit (network communicator, communication port, communication circuit, communication connecter, communication board) 36.

The terminal processor 30 is a processor which controls each unit of the tablet terminal 3. The terminal processor 30 is connected to the terminal non-volatile storage unit (terminal non-volatile storage) 31, the terminal memory 32, the terminal short-range wireless communication unit 33 (communication unit, communicator, communication port, communication circuit, communication connecter, communication board), the touch panel 34, the switch unit (switch) 35, and the network communication unit 36. The terminal processor 30 controls each unit of the tablet terminal 3 by transmitting and receiving data and signals to and from each unit.

The terminal non-volatile storage unit 31 is a memory which is formed of a flash memory, an Electrically Erasable Programmable Read Only Memory (EEPROM), or the like, and which stores programs to be executed by the terminal processor 30 and various types of data which are read out by the terminal processor 30 to execute and process a program.

In a case where the terminal processor 30 executes a program, the terminal memory 32 forms a work area for temporarily storing a program to be executed and data to be processed.

The terminal short-range wireless communication unit 33 is provided with a substrate formed by a circuit which communicates with the printer 2 in accordance with a communication standard relating to predetermined short-range wireless communication, such as, for example, Bluetooth, under the control of the terminal processor 30.

The touch panel 34 is provided with a display panel such as a liquid crystal display panel and a touch sensor overlapping or integrally provided with the display panel. The display panel displays various images under the control of the terminal processor 30. The touch sensor detects touch operations and outputs the touch operations to the terminal processor 30. The terminal processor 30 executes a process corresponding to the touch operations based on the input from the touch sensor.

The switch unit 35 is provided with operators such as switches provided in a housing, and outputs an operation signal to the terminal processor 30 in a case where these switches are operated. The terminal processor 30 executes a process corresponding to the operated operator based on the operation signal input from the switch unit 35.

Under the control of the terminal processor 30, the network communication unit 36 communicates with a device (web server or the like) connected to a global network GN in accordance with a predetermined communication standard. The communication standard used by the network communication unit 36 for communication may be any standard such as HTTP, WebSocket, or the like.

FIG. 2 is a functional block diagram of a terminal control unit 300 (control unit, CPU, processer) and a terminal storage unit 310 (storage) forming the control system of the tablet terminal 3.

The terminal storage unit 310 shown in FIG. 2 is a logical storage unit formed of the terminal non-volatile storage unit 31 and/or the terminal memory 32. The terminal control unit 300 and each functional unit of the terminal control unit 300 are formed by cooperation between software and hardware due to the terminal processor 30 executing a program. The terminal control unit 300 and each of the functional units of the terminal control unit 300 are formed of, for example, the terminal processor 30, the terminal memory 32, and the terminal non-volatile storage unit 31.

The terminal storage unit 310 stores a browser application program (referred to below as a "browser app") 311 (upper level program, dominance program), and a printer application program (referred to below as a "printer app") 312 (a printer program, lower level program, subordinate program). In this relationship, the upper level program calls and executes the lower level program, and the lower level program is called and executed by the upper level program.

The browser app 311 is an application program for the terminal control unit 300 to function as a browser execution unit 302 to be described below. The browser app 311 is installed in the tablet terminal 3 in advance.

The printer app 312 is an application program for the terminal control unit 300 to function as a print app execution unit (print app executer) 303 to be described below. The printer app 312 is installed in the tablet terminal 3 in advance.

The terminal control unit 300 has the functions of an operating system (OS) 301, the browser execution unit 302, and the print app execution unit 303. The functions of the operating system 301 are the function of a control program stored in the terminal storage unit 310, and each of the other units are the functions of application programs to be executed with the operating system 301.

The browser execution unit (browser executer) 302 is a functional unit which realizes browser functions by the terminal processor 30 reading out and executing the browser app 311. The browser execution unit 302 downloads a web page described in a mark-up language such as HTML or a script language from a predetermined web server connected to the global network GN through a function of the browser. The data of the downloaded web page is stored in the terminal storage unit 310, for example. The browser execution unit 302 reads the data of the downloaded web page through the function of the browser, generates display data for displaying the web page, and displays the data using the touch panel 34. In addition, the browser execution unit 302 transmits the information structured according to the URL scheme (referred to below as URL scheme information) to the printer app 312 using a function of a script installed on the web page.

The print app execution unit 303 is a functional unit which relays between the browser execution unit 302 and the printer 2 by the terminal processor 30 reading out and executing the printer app 312. When the print app execution unit 303 receives print data of a predetermined format (for example, Extensible Mark-up Language (XML) format) transmitted from the browser execution unit 302, the print app execution unit 303 converts the received print data to a control command of the command system corresponding to the printer 2. The control command includes character codes, commands for printing character codes, or the like based on the print data. In addition, when the print app execution unit 303 communicates with the printer 2 and receives the information described below from the printer, the print app execution unit 303 transmits the URL scheme information to the browser app 311.

Here, the URL scheme refers to a type of function of transmitting and receiving information (including data, commands, and the like) between an application program and another application program different from the application program.

The URL scheme is described in, for example, a format shown as "(application name)://(action)?(parameter)(&)...". "://" (mark, symbol, sign) is a delimiter separating the scheme. Before the "://" is a portion in which the application name which is the name of the application program is described and after the "://" is a command portion in which a command relating to the application program of the application name described in the previous portion is described.

In "(application name)", for example, identification information (for example, ID, name, and the like) for identifying the application program which is the transmission destination to which the information is transmitted is described, as the application name. For example, in a case of transmitting data from the browser app 311 to the printer app 312, the browser app 311 describes identification information for identifying the printer app 312 in the above format "(application name)".

"(Action)" describes the identification name of the process to be executed by the application program specified before "://". For example, in a case where a printing process is executed, the identification name of the printing process such as "Print" is described in "(action)". The description of "(action)" is omitted depending on the URL scheme information.

"(Parameter)" is a parameter given to an application program specified before "://", and a parameter item and a parameter value are described in association with each other. In a case of describing a plurality of "(parameters)", a linking symbol indicating "&" is used. In particular, in a case where "(action)" is described in the USL scheme information, "(parameter)" is a parameter given to the application program specified before "://" in the process described in "action".

For example, when transmitting the print data from the browser app 311 to the printer app 312, the browser app 311 transmits the following URL scheme information to the printer app. That is, the browser app 311 transmits URL scheme information of "(identification information for printer app)://(identification name indicating printing process)?(parameter item indicating item of print data type=parameter value indicating type)&(parameter item indicating item of print data=parameter value indicating print data)" to the printer app 312.

In this manner, the browser execution unit 302 transmits the URL scheme information to the print app execution unit 303. Then, the print app execution unit 303 causes the printer 2 to execute printing. In the present embodiment, the browser execution unit 302 defines various types of control of the printer 2 in the command portion of the URL scheme information. Then, the print app execution unit 303 causes the printer 2 to execute various types of control based on the URL scheme information acquired from the browser execution unit 302.

A description will be given below of a plurality of examples of the control of the printer 2 according to the URL scheme information.

In the following description, the browser execution unit 302 and the printer app 312 transmit and receive the URL scheme information. Therefore, below, the URL scheme information to be received by the printer app 312 is expressed as received URL scheme information (first information) and the URL scheme information to be transmitted by the printer app 312 is expressed as transmitted URL scheme information (third information). The transmission and reception of the URL scheme information between the browser execution unit 302 and the print app execution unit 303 corresponds to the transmission and reception of the URL scheme information between the browser app 311 and the printer app 312.

Control of Mechanism

First, a description will be given of control of a mechanism.

A description will be given below of the cutter 266 as an example of the mechanism.

Figure 4:
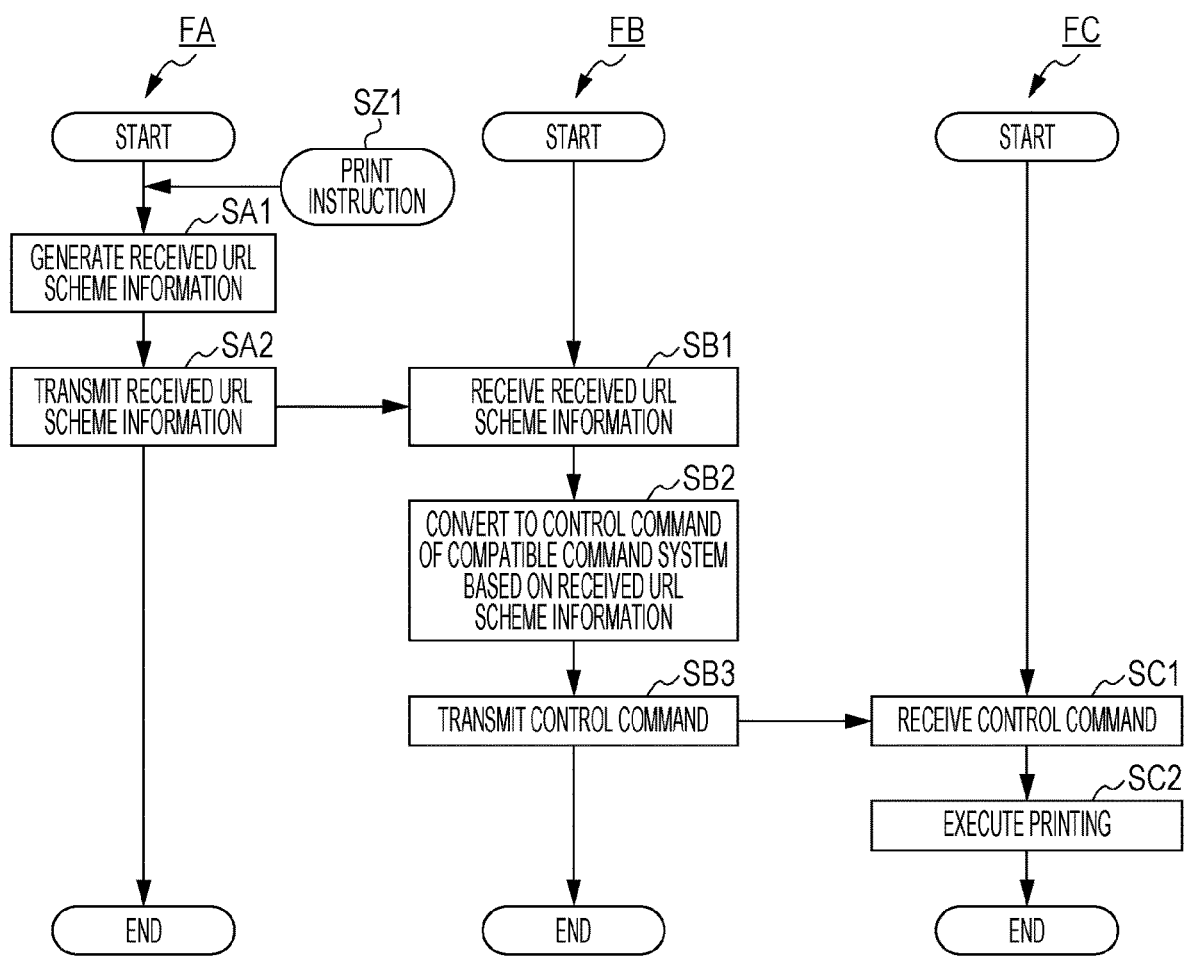
FIG. 4 is a flowchart showing operations of a tablet terminal and a printer.

FIG. 4 is a flowchart showing operations of the browser execution unit 302, the print app execution unit 303, and the printer 2. In FIG. 4, the flowchart FA shows the operation of the browser execution unit 302, the flowchart FB shows the operation of the print app execution unit 303, and the flowchart FC shows the operation of the printer 2.

As shown in the flowchart FA of FIG. 4, when a print instruction is input from the user by a user operation on a web page displayed by the touch panel 34 (step SZ1), the browser execution unit 302 generates received URL scheme information for the printer 2 to execute printing based on the print data (step SA1). In a case where the user instructs cutting of the roll paper by the cutter 266, the browser execution unit 302 generates received URL scheme information which specifies control of the cutter 266.

For example, in a case where the control mode of the cutter 266 set in advance or specified by the user is a control mode in which full-cutting is performed after transporting the roll paper by a predetermined amount, the browser execution unit 302 generates the following received URL scheme information (step SA1). Here, full-cutting is a cutting mode in which the roll paper is completely cut.

Received URL scheme information: "(identification information of printer app 312)://(identification name indicating printing process)?(parameter item indicating item of print data type=parameter value indicating type)&(parameter item indicating item of print data=parameter value indicating print data)&(parameter item indicating item of control mode of cutter 266=parameter value indicating "transport of roll paper+cutting")&(parameter item indicating item of transport of roll paper=parameter value indicating transport amount)&(parameter item indicating item of cutting mode=parameter value indicating full cutting)".

When the browser execution unit 302 generates the received URL scheme information, the browser execution unit 302 transmits the received URL scheme information to the print app execution unit 303 (step SA2).

Next, as shown in the flowchart FB of FIG. 4, the print app execution unit 303 receives the received URL scheme information from the browser execution unit 302 (step SB1). The print app execution unit 303 receiving the received URL scheme information from the browser execution unit 302 corresponds to the printer app 312 receiving the received URL scheme information from the browser app 311. In addition, receiving the received URL scheme information corresponds to acquiring the received URL scheme information.

Next, when the print app execution unit 303 receives the received URL scheme information, the print app execution unit 303 generates a control command of a command system compatible with (interpretable and executable by) the printer 2 based on the received URL scheme information (step SB2). This control command includes character codes, commands for printing character codes, or the like based on the print data included in the received URL scheme information. In addition, based on the control of the cutter 266 included in the received URL scheme information, the control command includes a command for full cutting (completely cutting) of the roll paper with the cutter 266 after transporting the roll paper by a predetermined amount in a command system compatible with the printer 2.

For example, the print app execution unit 303 receives the received URL scheme information: "(identification information of the printer app 312)://(identification name indicating printing process)?(parameter item indicating item of print data type=parameter value indicating type)&(parameter item indicating item of print data=parameter value indicating print data)&(parameter item indicating item of cutting=(parameter value indicating transport of roll paper and cutting)&(parameter item indicating transport item of roll paper=parameter value indicating transport amount)&(parameter item indicating item of cutting mode=parameter value indicating full cutting)". In such a case, the print app execution unit 303 generates a control command specifying that the transport motor 264 transports the roll paper by a transport amount corresponding to the parameter item indicating the item of roll paper transport after completing printing based on the print data, and a command specifying that the cutter 266 perform full cutting of the roll paper.

When the print app execution unit 303 generates the control command, the print app execution unit 303 transmits the generated control command to the printer 2 by the terminal short-range wireless communication unit 33 (step SB3).

As shown in the flowchart FC of FIG. 4, the printing device processor 20 of the printer 2 receives the control command from the printing device short-range wireless communication unit 23 (step SC1). Next, the printing control unit 201 of the printing device control unit 200 controls the printing unit 26 to execute printing based on the control command (step SC2). In particular, after executing printing, the printing control unit 201 transports the roll paper by the transport motor 264, and thereafter executes printing in the printing mode in which the roll paper is subjected to full cutting by the cutter 266.

In this manner, the terminal processor 30 executing the printer app 312 causes the terminal processor 30 to function as the print app execution unit 303. That is, the print app execution unit 303 acquires the received URL scheme information, which specifies the control of the cutter 266, from the browser execution unit 302 and converts the acquired received URL scheme information into a control command of a command system compatible with the printer 2. This control command includes a command which specifies the same control mode as the control mode of the cutter 266 included in the URL scheme information. Then, the print app execution unit 303 transmits this control command to the printer 2. Due to this, acquiring the received URL scheme information which specifies the control of the cutter 266 makes it possible for the print app execution unit 303 to cause the printer 2 to execute control of the cutter 266. Due to this, the user specifying the control of the cutter 266 on the web page makes it possible for the print app execution unit 303 to control the cutter 266 of the printer 2 at arbitrary timings according to the URL scheme.

In the above description, examples of control modes of the cutter 266 include a control mode in which the roll paper is transported by a predetermined amount and then subjected to full cutting. However, the control mode of the cutter 266 is not limited thereto. For example, the control mode of the cutter 266 may be a control mode in which the roll paper is cut without being transported or a control mode in which the roll paper is neither transported nor cut. In addition, although full cutting is exemplified as a cutting mode, partial cutting may be used. The partial cutting is a cutting mode in which the roll paper is not completely cut but cut to leave a part thereof behind.

In the related art, the installation of an application program for relaying between the browser app 311 and the printer 2 in a terminal device such as the tablet terminal 3 is known. The reason for the installation of an application program having a relay function is that, in general, it may not be possible to set detailed settings corresponding to the printer 2 when transmitting print data from the browser app 311 to the printer 2. In addition, in the related art, in the browser app 311, it is possible to specify the control of the cutter 266 of the printer 2 simply by not transmitting the print data to the relay application program. Therefore, the relay application program executes control of the cutter 266 of the printer 2 independently of the browser app 311. However, in order to control the cutter 266 independently of the browser app 311, the execution timing of the control of the cutter 266 becomes the timing at which each predetermined data amount is transmitted to the printer 2, every time of transmission, or the like, and execution is not possible at arbitrary timings. In addition, since the cutter 266 is controlled independently of the browser app 311, the cutting mode or the control mode of the cutter 266 desired by the user may not be obtained.

Therefore, it is possible for the print app execution unit 303 to cause the printer 2 to execute control of the cutter 266 by acquiring the received URL scheme information which specifies the control of the cutter 266. Due to this, the user specifying control of the cutter 266 on the web page makes it possible for the print app execution unit 303 to execute control of the cutter 266 of the printer 2 at arbitrary timings according to the URL scheme and in an arbitrary control mode of the cutter 266 (also including the cutting mode).

In the explanation of the control of the mechanism, the cutter 266 is exemplified as the mechanism, but the object to be controlled is not limited to the cutter 266. For example, the mechanism which is the object to be controlled may be the transport motor 264. In such a case, parameters related to the control of the transport motor 264 are described in the received URL scheme information to be transmitted by the browser execution unit 302 to the print app execution unit 303. Examples of the parameters described in such a case include "(parameter item indicating transport item of transport motor 264=parameter value indicating execution of transport of roll paper)&(parameter item indicating item of transport amount=parameter value indicating transport amount".

Control of External Device Connecting to Printer

Next, a description will be given of control of an external device connected to the printer 2.

Below, the drawer 43 is exemplified as an external device connected to the printer 2.

Figure 3:
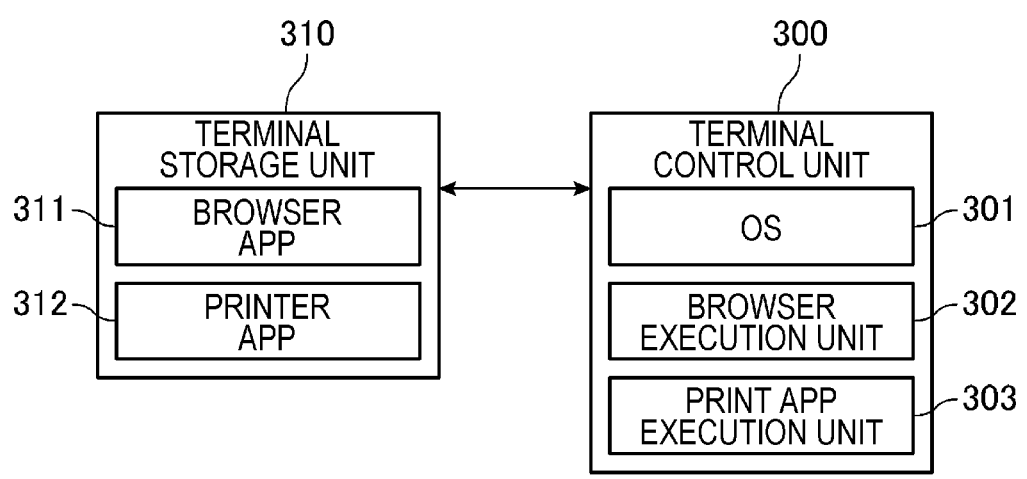
FIG. 3 is a functional block diagram of a terminal control unit and a terminal storage unit.

The flowchart shown in FIG. 3 will be used for the explanation of the control of the external device connected to the printer 2.

When a print instruction is input by a user operation on a web page (step SZ1), the browser execution unit 302 generates received URL scheme information for causing the printer 2 to execute printing based on the print data (step SA1). Here, the browser execution unit 302 generates received URL scheme information which specifies control of the drawer 43.

For example, in a case where the control of the drawer 43 set in advance or specified by the user is control for shifting the state of the drawer 43 to the open state, the browser execution unit 302 generates the following received URL scheme information (step SA1).

Received URL scheme information: "(identification information of printer app 312)://(identification name indicating printing process)?(parameter item indicating item of print data type=parameter value indicating type)&(parameter item indicating item of print data=parameter value indicating print data)&(parameter item indicating control item of drawer 43=parameter value indicating shift to open state)".

When the browser execution unit 302 generates the received URL scheme information, the browser execution unit 302 transmits the received URL scheme information to the print app execution unit 303 (step SA2).

Next, as shown in the flowchart FB of FIG. 3, the print app execution unit 303 receives the received URL scheme information from the browser execution unit 302 (step SB1).

Next, when the print app execution unit 303 receives the received URL scheme information, the print app execution unit 303 generates a control command of a command system compatible with (interpretable by) the printer 2 based on the received URL scheme information (step SB2). This control command includes character codes or a command for printing character codes based on the print data included in the received URL scheme information. In addition, the control command includes a command to shift the drawer 43 to the open state in a command system compatible with the printer 2 based on the control of the drawer 43 included in the received URL scheme information.

For example, the print app execution unit 303 receives received URL scheme information: "(identification information of the printer app 312)://(identification name indicating printing process)?(parameter item indicating item of print data type=parameter value indicating type)&(parameter item indicating item of print data=parameter value indicating print data)&(parameter item indicating control item of drawer 43=parameter value indicating shift to open state)". In such a case, when executing printing based on the print data, the print app execution unit 303 generates a control command including a command to shift the drawer 43 to the open state.

When the print app execution unit 303 generates the control command, the print app execution unit 303 transmits the generated control command to the printer 2 by the terminal short-range wireless communication unit 33 (step SB3).

As shown in the flowchart FC of FIG. 4, the printing device control unit 200 of the printer 2 receives the control command from the printing device short-range wireless communication unit 23 (step SC1). Next, the printing device control unit 200 controls the printing unit 26 to execute printing based on the control command (step SC2). In particular, the external device control unit 202 of the printing device control unit 200 outputs a control signal to the drawer 43 using the device communication unit 27. When the control signal receiving unit 431 of the drawer 43 receives the control signal, the control signal receiving unit 431 generates data which specifies a shift to the open state, and outputs the data to the withdrawal driving mechanism 432. Then, the withdrawal driving mechanism 432 releases the lock of the lock mechanism of the tray accommodating cash or the like and shifts the drawer 43 to the open state.

In this manner, the terminal processor 30 executing the printer app 312 causes the terminal processor 30 to function as the print app execution unit 303. That is, the print app execution unit 303 acquires the received URL scheme information which specifies the control of the drawer 43 from the browser execution unit 302, and converts the acquired received URL scheme information into a control command of a command system compatible with the printer 2. Then, the print app execution unit 303 transmits this control command to the printer 2. Due to this, acquiring the received URL scheme information which specifies control of the cutter 266 makes it possible for the print app execution unit 303 to cause the printer 2 to execute the control of the drawer 43. Accordingly, the user specifying control of the drawer 43 on the web page makes it possible for the print app execution unit 303 to control the drawer 43 at arbitrary timings according to the URL scheme.

In the description of the control of the external device connected to the printer 2, the drawer 43 is exemplified as the external device, but the external device to be controlled is not limited to the drawer 43. For example, the external device to be controlled may be the customer display 41. In such a case, the parameters related to the control of the customer display 41 are described in the received URL scheme information to be transmitted from the browser execution unit 302 to the print app execution unit 303. Examples of the parameters described in such a case include "(parameter item indicating the control item of the customer display 41=parameter value indicating execution of display of the customer display)&(parameter item indicating item of display data=parameter value indicating display data)".

Transmission of Printer Status

Next, a description will be given of the transmission of the status of the printer 2.

Figure 5:
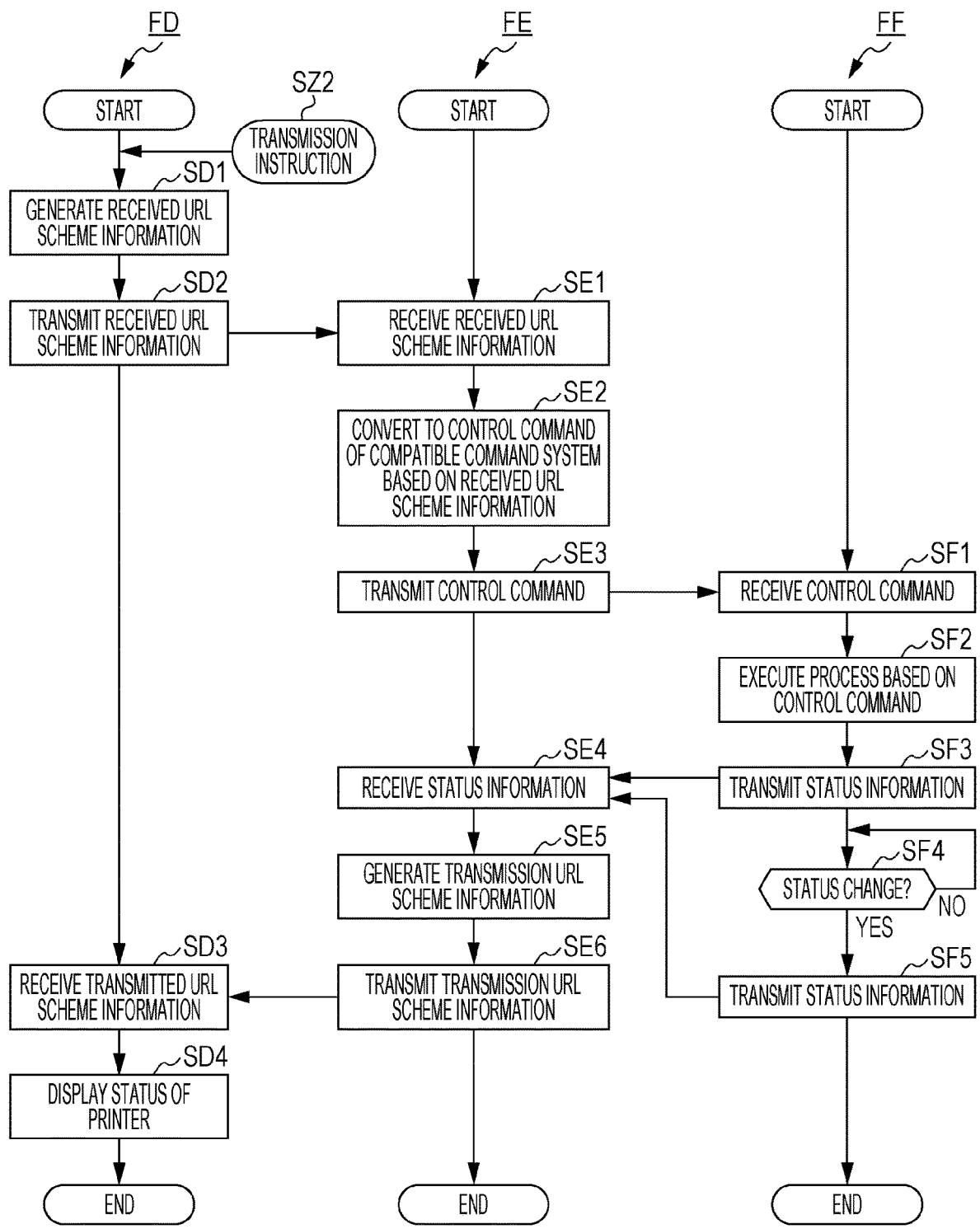
FIG. 5 is a flowchart showing operations of a tablet terminal and a printer.

FIG. 5 is a flowchart showing the operations of the browser execution unit 302, the print app execution unit 303, and the printer 2. In FIG. 5, the flowchart FD shows the operation of the browser execution unit 302, the flowchart FE shows the operation of the print app execution unit 303, and the flowchart FF shows the operation of the printer 2.

As shown in a flowchart FD of FIG. 5, when an instruction to transmit the status of the printer 2 is input from the user based on a user operation on the web page (step SZ2), the browser execution unit 302 generates received URL scheme information which specifies the transmission of the status of the printer 2 (step SD1).

For example, the browser execution unit 302 generates the following received URL scheme information (step SD1).

Received URL scheme information: "(identification information of the printer app 312)://?(parameter item indicating item of transmission of status of printer 2=parameter value indicating transmission) & (parameter item indicating item of transmission setting of status at the time of status change=parameter value indicating setting validation)".

When the received URL scheme information is generated, the browser execution unit 302 transmits the received URL scheme information to the print app execution unit 303 (step SD2).

Next, as shown in the flowchart FE of FIG. 5, the print app execution unit 303 receives the received URL scheme information from the browser execution unit 302 (step SE1).

Next, when the received URL scheme information is received, the print app execution unit 303 generates a control command of a command system compatible with the printer 2 based on the received URL scheme information (step SE2).

For example, the print app execution unit 303 receives "Received URL scheme information: (identification information of printer app 312)://?(parameter item indicating item of transmission of status of printer 2=parameter value indicating transmission) & (parameter item indicating transmission setting of status at the time of status change=parameter value indicating setting validation)". In such a case, the print app execution unit 303 generates a control command (second information) including a command requesting transmission of the status of the printer 2 and a command which specifies a setting for causing the status of the printer to be transmitted at the time of status change.

When the control command is generated, the print app execution unit 303 transmits the generated control command to the printer 2 by the terminal short-range wireless communication unit 33 (step SE3).

As shown in the flowchart FF of FIG. 5, the printing device control unit 200 of the printer 2 receives the control command from the printing device short-range wireless communication unit 23 (step SF1). Next, the printing device control unit 200 executes a process based on the control command (step SF2).

As described above, the control command includes a command requesting the transmission of the status of the printer 2. Therefore, in step SF2, the status control unit 203 acquires the status of the printer 2.

In addition, as described above, the control command includes a command specifying a setting for causing the status of the printer 2 to be transmitted at the time of status change. Therefore, in step SF2, the status control unit 203 of the printing device control unit 200 executes a setting for transmitting the status of the printer 2 at the time of status change. For example, referring to the setting file 212, the status control unit 203 sets the setting value corresponding to the setting item for transmitting the status of the printer 2 at the time of status change to the setting value indicating validity.

Next, the status control unit 203 transmits the status information indicating the status of the printer 2 acquired in step SF2 to the tablet terminal 3 by the printing device short-range wireless communication unit 23 (step SF3).

As shown in the flowchart FE of FIG. 5, the print app execution unit 303 of the terminal control unit 300 of the tablet terminal 3 receives the status information from the printer 2 by the terminal short-range wireless communication unit 33 (step SE4).

Next, based on the received status information, the print app execution unit 303 generates transmitted URL scheme information indicating the acquired status of the printer 2 (step SE5). In step SE5, the print app execution unit 303 generates transmitted URL scheme information as described below.

For example, in a case where the status information includes information indicating being out of roll paper, no head error, and no cutter error, the generated transmitted URL scheme information is "(identification information of the browser app 311)://?(parameter item indicating item of presence or absence of being out of roll paper=parameter value indicating being out of roll paper)&(parameter item indicating item of presence or absence of head error=parameter value indicating absence of head error)& (parameter item indicating item of presence or absence of cutter error=parameter value indicating absence of cutter error)".

Next, the print app execution unit 303 transmits the generated transmitted URL scheme information to the browser execution unit 302 (step SE6).

As shown in the flowchart FD of FIG. 5, the browser execution unit 302 receives the transmitted URL scheme information from the print app execution unit 303 (step SD3). Then, the browser execution unit 302 causes the touch panel 34 to display a web page displaying the status of the printer 2 included in the received transmitted URL scheme information so as to cause the touch panel 34 to display the status of the printer 2 (step SD4). For example, the browser execution unit 302 receives transmitted URL scheme information of "(identification information of browser app 311):// ?(parameter item indicating item of presence or absence of being out of roll paper=parameter value indicating being out of roll paper)&(parameter item indicating item of presence or absence of head error=parameter value indicating absence of head error)&(parameter item indicating item of presence or absence of cutter error=parameter value indicating absence of cutter error)". In this case, the browser execution unit 302 causes the touch panel 34 to display information indicating being out of roll paper, no head errors, and no cutter errors as the status of the printer 2.

In this manner, the terminal processor 30 executing the printer app 312 causes the terminal processor 30 to function as the print app execution unit 303. That is, the print app execution unit 303 acquires the received URL scheme information which specifies the transmission of the status of the printer 2 from the browser execution unit 302, and converts the acquired received URL scheme information to a control command of a command system compatible with the printer 2. As described above, this control command includes a command requesting the transmission of the status of the printer 2 and a command which specifies a setting for causing the status of the printer to be transmitted at the time of status change. The print app execution unit 303 transmits the generated control command to the printer 2. Due to this, acquiring the received URL scheme information which specifies the transmission of the status of the printer 2 makes it possible for the print app execution unit 303 to cause the printer 2 to transmit the status. Due to this, the user specifying the transmission of the status of the printer 2 on the web page makes it possible for the print app execution unit 303 to cause the printer 2 to transmit the status at arbitrary timings according to the URL scheme. In addition, when the status information is received, the print app execution unit 303 transmits the transmitted URL scheme information to the browser execution unit 302. Due to this, the user specifying the transmission of the status of the printer 2 on the web page makes it possible for the print app execution unit 303 to present the status of the printer 2 to the user at arbitrary timings according to the URL scheme.

Returning to the explanation of the flowchart FF in FIG. 5, when the status control unit 203 of the printing device control unit 200 executes a setting for transmitting the status of the printer 2 at the time of status change in step SF2, it is determined whether or not the status of the printer 2 has changed (step SF4). Here, it is possible to adopt any of the determination methods as a method of determining whether or not the status of the printer 2 changed.

In a case where the status control unit 203 determines that the status of the printer 2 is not changed (step SF4: NO), the status control unit 203 continues monitoring the status change of the printer 2. On the other hand, in a case where the status control unit 203 determines that the status of the printer 2 is changed (step SF4: YES), the status control unit 203 transmits status information indicating the changed status of the printer 2 to the tablet terminal 3 by the printing device short-range wireless communication unit 23 (step SF5).

Then, the print app execution unit 303 receives status information indicating the changed status of the printer 2, generates transmitted URL scheme information (step SE5), and transmits the information to the browser execution unit 302 (step SE6). The browser execution unit 302 receives the transmitted URL scheme information from the print app execution unit 303 (step SD3). Next, the browser execution unit 302 causes the touch panel 34 to display the changed status of the printer 2 (step SD4).

In this manner, the terminal control unit 300 executing the printer app 312 causes the terminal control unit 300 to function as the print app execution unit 303. That is, the print app execution unit 303 causes the printer 2 to execute a setting for causing the printer 2 to transmit the status when the status of the printer 2 changes. When acquiring the changed status information of the printer 2 from the printer 2, the print app execution unit 303 transmits the transmitted URL scheme information indicating the changed status of the printer 2 to the browser execution unit 302. Due to this, in a case where the status of the printer 2 changes, it is possible for the print app execution unit 303 to cause the browser execution unit 302 to promptly acquire the status of the printer 2. Therefore, it is possible for the browser execution unit 302 to cause the touch panel 34 to promptly display the status of the printer 2 in which a change occurred. Therefore, in a case where the status of the printer 2 changes, it is possible for the tablet terminal 3 to display the status of the printer 2 without a user operation, thus, the user is able to promptly recognize the changed status of the printer 2.

In the above description, examples of the statuses transmitted by the printer 2 include the presence or absence of being out of roll paper, the presence or absence of a head error, and the presence or absence of a cutter error. However, the statuses to be transmitted by the printer 2 are not limited thereto.

For example, the status transmitted by the printer 2 may be transmitted after further adding the presence or absence of a paper jam in the roll paper, whether or not a cover for covering the housing portion for accommodating the roll paper is in an open state, or the like.

In addition, the printer 2 may be configured to transmit the status of an external device connected to the printer 2 instead of the status of the printer 2. For example, in a case of receiving the command indicating the transmission request of the status of the external device from the print app execution unit 303, the printer 2 transmits information indicating the status of the drawer 43 to the print app execution unit 303 instead of the status of the printer 2 itself. In addition, for example, in a case where the drawer 43 shifts from the closed state to the open state, the printer 2 transmits status information which indicates that the drawer 43 is in an open state to the print application execution unit 303 without waiting to receive a control command from the print app execution unit 303.

In addition, the status information to be transmitted by the printer 2 may be information indicating whether the state of the printer 2 is a state in which printing based on the print data succeeded or failed. In such a case, the received URL scheme information to be transmitted by the browser execution unit 302 is, for example, the following information.

For example, the print app execution unit 303 receives received URL scheme information: "(identification information of the printer app 312)://(identification name indicating printing process)?(parameter item indicating item of print data type=parameter value indicating type)&(parameter item indicating item of print data=parameter value indicating print data)&(parameter item indicating item of cutting=parameter value indicating cutting)&(parameter item indicating item of cutting mode=parameter value indicating full cutting)&(parameter item indicating item of transmission of printing success or printing failure=parameter value indicating validation)". In such a case, the print app execution unit 303 generates a control command including a command requesting transmission of information indicating whether or not printing (including cutting) based on the print data succeeded or failed. In a case where the printing succeeded, the print app execution unit 303 receives the status information indicating the printing succeeded from the printer 2, and transmits transmitted URL scheme information indicating the printer 2 succeeded in printing to the browser execution unit 302. On the other hand, in a case where the printing failed, the print app execution unit 303 receives status information indicating the printing failed from the printer 2, and transmits transmitted URL scheme information indicating that the printer 2 is in a printing failure state to the browser execution unit 302. Due to this, it is possible for the user to easily recognize whether the printing failed or succeeded on a web page displayed by the touch panel 34.

As described above, the printer app 312 (printer program) is an application program executed by the terminal processor 30 (processor) of the tablet terminal 3 (terminal) connectable to the printer 2, and is stored in a non-transitory processor readable medium such as the terminal storage unit 310. The printer app 312 is structured according to the URL scheme from the browser app 311 (upper level program, dominance program) which is read out and executed by the terminal processor 30 and which operates in the upper level layer of the printer app 312, acquires received URL scheme information (first information) which specifies predetermined control of the printer 2, converts the received URL scheme information into a control command (second information)

executable by the printer 2, and transmits the converted control command to the printer 2.

According to this configuration, the printer app 312 is executed by the terminal processor 30 of the tablet terminal to acquire received URL scheme information which is structured according to the URL scheme and which specifies predetermined control of the printer, such that it is possible to cause the printer 2 to execute the predetermined control. Therefore, the printer app 312 is executed by the terminal processor 30, such that it is possible to carry out various types of control of the printer 2 at arbitrary timings according to the URL scheme.

In addition, the received URL scheme information includes information which specifies the control of the mechanism of the printer 2, while the control command is executable by the printing device processor 20 of the printer 2 and includes a command which controls the mechanism of the printer 2.

According to this configuration, the printer app 312 is executed by the terminal processor 30 of the tablet terminal 3, and acquires received URL scheme information which is structured according to the URL scheme and which specifies control of the mechanism of the printer 2, such that it is possible to cause the printer 2 to execute control of the mechanism. Therefore, the printer app 312 is executed by the terminal processor 30 and makes it possible to control the mechanism of the printer 2 at arbitrary timings according to the URL scheme.

In addition, the received URL scheme information includes information in which control of an external device connected to the printer 2 is specified, while the control command includes a command which specifies control of the external device by the printer 2.

According to this configuration, the printer app 312 is executed by the terminal processor 30 of the tablet terminal 3 and acquires received URL scheme information which is structured according to a URL scheme and which specifies control of the external device connected to the printer 2, such that it is possible to cause the printer 2 to execute control of the external device. Therefore, the printer app 312 is executed by the terminal processor 30, and makes it possible to control an external device connected to the printer 2 at arbitrary timings according to the URL scheme.

In addition, the received URL scheme information includes information which specifies the transmission of the status of the printer 2, while the control command includes a command for causing the status to be transmitted from the printer 2. When the printer app 312 is executed by the terminal processor 30 and the status is received from the printer 2, the printer app 312 causes the browser app 311 to acquire the transmitted URL scheme information (third information) structured according to the URL scheme.

According to this configuration, the printer app 312 is executed by the terminal processor of the tablet terminal 3 and acquires received URL scheme information which is structured according to the URL scheme and which specifies the transmission of the status of the printer, such that it is possible to cause the printer 2 to transmit the status. Therefore, the printer app 312 is executed by the terminal processor 30 and it is possible to acquire the status from the printer 2 at arbitrary timings according to the URL scheme.

In addition, the received URL scheme information includes information which specifies a setting for causing the printer 2 to transmit a status when the status of the printer 2 changes, while the control command includes a command which specifies a setting which causes the printer 2 to transmit the status when the status of the printer 2 changes.

Even when the received URL scheme information is not acquired from the browser app 311 in the terminal processor 30, the printer app 312 causes the browser app 311 to acquire the transmitted URL scheme information in a case of receiving the status from the printer 2.

According to this configuration, in a case where the printer app 312 is executed by the terminal processor 30 and the status of the printer 2 changes, it is possible to promptly acquire the status of the printer 2.

Here, each of the embodiments described above shows only one embodiment of the invention, and arbitrary modifications and applications are possible within the scope of the invention.

For example, it is also possible to realize the function of the print app execution unit 303 in the form of a non-transitory processor readable medium which stores the printer app 312, a server device which distributes the printer app 312, a transmission medium which transmits the printer app 312, a data signal in which the printer app 312 is realized in a carrier wave, or the like. As the non-transitory processor readable medium, it is possible to use various media able to be read by a processor of a computer such as a terminal and the non-transitory processor readable medium may be any type of magnetic or optical non-transitory processor readable medium or medium using a semiconductor memory device, or other kinds of storage media may be used. In addition, the non-transitory processor readable medium may be a portable non-transitory processor readable medium such as a memory card. In addition, the non-transitory processor readable medium may be a non-transitory processor readable medium provided in a device connected to the device described above via a communication line.

In addition, for example, in a case where the control method (terminal control method) of the tablet terminal 3 is realized using a computer provided in the tablet terminal 3 or an external device connected to the tablet terminal 3, it is also possible to configure the invention in the form of a program executed by a processor of a computer in order to realize the method described above, a recording medium in which the program is recorded to be readable by a processor of a computer, or a transmission medium for transmitting the program. As the recording medium, it is possible to use a magnetic or optical recording medium or a semiconductor memory device. Specific examples thereof include a portable or fixed recording medium such as a flexible disk, a hard disk drive (HDD), a compact disc read only memory (CD-ROM), a digital versatile disk (DVD), a Blu-ray (registered trademark) disc, a magneto-optical disc, a flash memory, or a card type recording medium. In addition, the recording medium described above may be a non-volatile storage device such as a random-access memory (RAM), a read only memory (ROM), or an HDD, which is an internal storage device provided in the tablet terminal 3 or an external device connected to the tablet terminal 3. This also applies to the control method of the printer 2.

In addition, although a case is exemplified where the functions of the terminal control unit 300 and the printing device control unit 200 are realized by one processor, the functions may be realized by a plurality of processors or semiconductor chips. For example, the terminal control unit 300 and the printing device control unit 200 may be configured to be further provided with a sub-processing device (co-processor) such as a System-on-a-Chip (SoC), a Micro Control Unit (MCU), or a Field-Programmable Gate Array (FPGA). In addition, the terminal control unit 300 and the printing device control unit 200 may cause both the CPU and the sub-processing device to cooperate, or may selectively use one of the two to perform various types of control.

In addition, for example, the processing units in FIG. 4 and FIG. 5 are divided according to the main process contents in order to make the processes easier to understand, and the invention is not limited by the manner of dividing the processing units or the names thereof. Depending on the process content, the invention may be further divided into a greater number of processing units. In addition, the invention may be divided such that one processing unit includes a greater number of processes. In addition, the order of the processes may be appropriately changed in a range not obstructing the gist of the invention.

In addition, each of the functional units shown in FIG. 1, FIG. 2, and FIG. 3 represents a functional configuration, and the specific embodiments thereof are not particularly limited. That is, it is not always necessary to mount hardware corresponding to each functional unit individually, but it is of course possible to have a configuration in which the functions of a plurality of functional units are realized by executing a program using one processor. In addition, some of the functions realized by software in the above-described embodiments may be implemented by hardware, or some of the functions realized by hardware may be realized by software. In addition, it is possible for specific detailed configurations of the tablet terminal 3 and other parts of the printer 2 to be arbitrarily changed without departing from the gist of the invention.

What is claimed is:

1. A non-transitory processor readable medium storing a printer program read out and executed by a processor in a terminal connectable to a printer including a printing mechanism to execute steps including:
    acquiring first information from a browser application of the printer program,
    wherein the first information is structured according to a Uniform Resource Locator (URL) scheme including a parameter item related to a control of the printing mechanism,
    wherein the printing mechanism includes a cutter to cut a roll paper, and
    wherein the parameter item indicates a control mode of the cutter;
    converting, based on the control mode of the cutter, the first information into second information executable by the printer; and
    transmitting the converted second information to the printer.

2. The non-transitory processor readable medium storing the printer program according to claim 1,
    wherein the second information includes a command which is executable by the printer and which is for controlling the printing mechanism.

3. The non-transitory processor readable medium storing a printer program according to claim 1,
    wherein the first information includes information in which control of an external device connected to the printer is specified, and
    the second information includes a command which specifies control of the external device by the printer.

4. The non-transitory processor readable medium storing a printer program according to claim 1,
    wherein the first information includes information in which transmission of a status of the printer is specified,
    the second information includes a command for causing the status to be transmitted from the printer, and
    the steps further include
    acquiring third information structured according to the URL scheme in the upper level program when the status is received from the printer.

5. The non-transitory processor readable medium storing a printer program according to claim 4,
    wherein the first information includes information in which a setting is specified for causing the printer to transmit the status when the status of the printer changes,
    the second information includes a command for instructing a setting for causing the printer to transmit the status when the status of the printer changes, and
    the steps further include
    acquiring the third information in the upper level program when the status is received from the printer even if the first information is not acquired from the upper level program.

6. The non-transitory processor readable medium storing the printer program according to claim 1, wherein the printing mechanism further includes a transport motor to transport the roll paper.

7. The non-transitory processor readable medium storing the printer program according to claim 6, wherein the control mode of the cutter is one of:
    a first control mode in which the roll paper is subjected to cut after transport of the roll paper by an amount;
    a second control mode in which the roll paper is subjected to cut without transport of the roll paper; or
    a third control mode in which the roll paper is neither subjected to cut nor transported, and
    wherein cut of the roll paper is one of a full cut or a partial cut.

8. A terminal, which is able to communicate with a printer including a printing mechanism, comprising:
    a memory which stores a printer program and a browser application of the printer program; and
    a processor which reads out and executes the browser application and the printer program from the memory,
    wherein the processor
    reads out and executes the browser application from the memory to generate first information which is structured according to a Uniform Resource Locator (URL) scheme including a parameter item related to a control of the printing mechanism,
    wherein the printing mechanism includes a cutter to cut a roll paper, and
    wherein the parameter item indicates a control mode of the cutter; and
    reads out and executes the printer program from the memory to convert, based on the control mode of the cutter, the first information into second information executable by the printer and transmit the converted second information to the printer.

9. The terminal according to claim 8,
    wherein the second information is executable by the printer and includes a command for controlling the printing mechanism.

10. The terminal according to claim 8,
    wherein the first information includes information in which control of an external device connected to the printer is specified, and
    the second information includes a command which specifies control of the external device by the printer.

11. The terminal according to claim 8,
wherein the first information includes information in which transmission of the status of the printer is specified,
the second information includes a command for causing the status to be transmitted from the printer, and
the processor causes the upper level program to
acquire third information structured according to the URL scheme when the status is received from the printer.

12. The terminal according to claim 11,
wherein the first information includes information in which a setting is specified for causing the printer to transmit the status when the status of the printer changes,
the second information includes a command for instructing a setting for causing the printer to transmit the status when the status of the printer changes, and
the processor causes the upper level program to
acquire the third information when the status is received from the printer even if the first information is not acquired from the upper level program.

13. The terminal according to claim 8, wherein the printing mechanism further includes a transport motor to transport the roll paper.

14. The terminal according to claim 13, wherein the control mode of the cutter is one of:
a first control mode in which the roll paper is subjected to cut after transport of the roll paper by an amount;
a second control mode in which the roll paper is subjected to cut without transport of the roll paper; or
a third control mode in which the roll paper is neither subjected to cut nor transported, and
wherein cut of the roll paper is one of a full cut or a partial cut.

15. A method of controlling a terminal which is able to communicate with a printer including a printing mechanism, the method comprising:
executing a printer program and a browser application of the printer program,
generating first information which is structured according to a Uniform Resource Locator (URL) scheme including a parameter item related to a control of the printing mechanism through the browser application,
wherein the printing mechanism includes a cutter to cut a roll paper, and
wherein the parameter item indicates a control mode of the cutter;
converting, based on the control mode of the cutter, the first information into second information executable by the printer; and
transmitting the converted second information to the printer through the printer program.

16. The method of controlling the terminal according to claim 15,
wherein the second information includes a command which is executable by the printer and which is for controlling the printing mechanism.

17. The method of controlling a terminal according to claim 15,
wherein the first information includes information in which control of an external device connected to the printer is specified, and
the second information includes a command which specifies control of the external device by the printer.

18. The method of controlling a terminal according to claim 15,
wherein the first information includes information in which transmission of the status of the printer is specified,
the second information includes a command for causing the status to be transmitted from the printer, and
the method further comprises:
causing the upper level program to
acquire third information structured according to the URL scheme when a status is received from the printer.

19. The method of controlling a terminal according to claim 18,
wherein the first information includes information in which a setting is specified for causing the printer to transmit the status when the status of the printer changes,
the second information includes a command for instructing a setting for causing the printer to transmit the status when the status of the printer changes, and
the method further comprises: causing the upper level program to
acquire the third information when the status is received from the printer even if the first information is not acquired from the upper level program.

20. The method of controlling the terminal according to claim 15, wherein the printing mechanism further includes a transport motor to transport the roll paper.

21. The method of controlling the terminal according to claim 20, wherein the control mode of the cutter is one of:
a first control mode in which the roll paper is subjected to cut after transport of the roll paper by an amount;
a second control mode in which the roll paper is subjected to cut without transport of the roll paper; or
a third control mode in which the roll paper is neither subjected to cut nor transported, and
wherein cut of the roll paper is one of a full cut or a partial cut.

* * * * *